(No Model.)
E. P. LYNCH.
WHEEL PLOW.
No. 376,536. Patented Jan. 17, 1888.
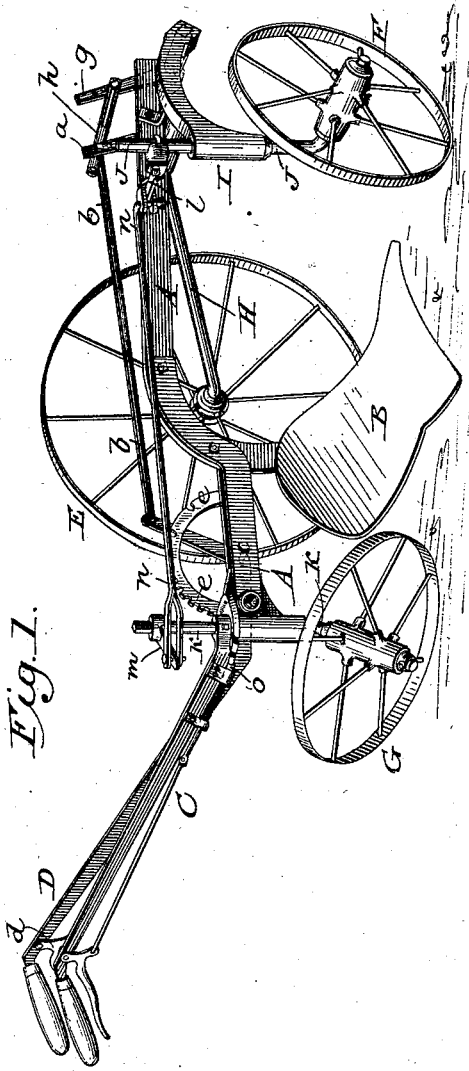
Fig. 1.
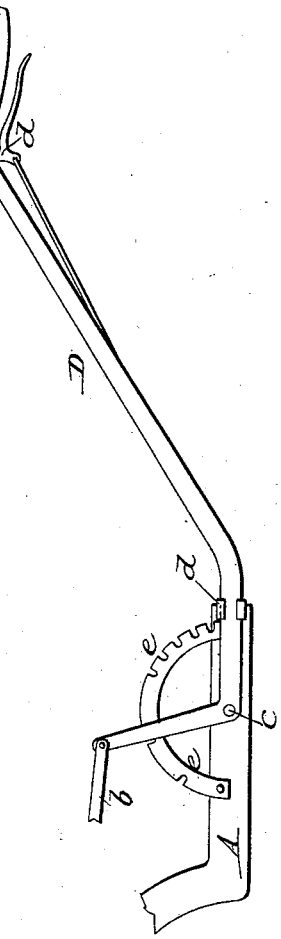
Fig. 2.
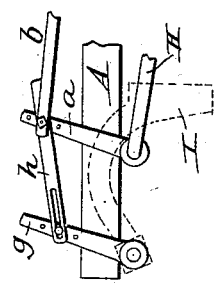
Attest:
Sidney P. Hollingsworth
W. R. Kennedy
Inventor:
E. P. Lynch,
By his Atty.
Phil. T. Dodge.

UNITED STATES PATENT OFFICE.

EDWARD P. LYNCH, OF DAVENPORT, IOWA.

WHEEL-PLOW.

SPECIFICATION forming part of Letters Patent No. 376,536, dated January 17, 1888.

Application filed November 17, 1887. Serial No. 255,436. (No model.)

*To all whom it may concern:*

Be it known that I, EDWARD P. LYNCH, of Davenport, in the county of Scott and State of Iowa, have invented certain Improvements in Wheeled Plows, of which the following is a specification.

My invention has reference to that class of plows in which one or more mold-boards are secured to a frame or beam carried by vertically-adjustable land and furrow wheels and by a trailing or steering wheel at the rear.

The improvements pertain more particularly to those implements which are provided with two divergent rearwardly-extending controlling-handles to be grasped by the attendant walking behind; and they consist in an improved construction and combination of parts for controlling the wheels both as to their vertical and lateral movements.

In the accompanying drawings, Figure 1 is a perspective view of my implement from the furrow side. Fig. 2 is an outline elevation of the devices for adjusting the wheels vertically.

Referring to the drawings, A represents a rigid beam or frame of any appropriate form, having one or more mold-boards, B, or equivalent plows, bolted or otherwise secured thereto, and C D are two handles secured to the frame and extending rearward, after the manner of the handles of ordinary walking-plows, so that they may be constantly grasped by the attendant to control the course and operation of the implement.

E, F, and G represent, respectively, the land-wheel, the leading-wheel, which travels in the furrow last completed, and the steering-wheel, which travels in the new furrow behind the mold-board or plow proper.

The land-wheel is carried by a journal on the lower end of a crank-axle, H, the upper end of which has a second horizontal journal seated in a box or bearing on the frame, so that the wheel may be swung upward and downward. At its inner end the axle has a crank-arm, *a*, which is connected by a rod, *b*, to the forward upturned end of the left plow-handle, D. This handle, instead of being fastened immovably, as usual, is connected to the frame by a horizontal pivot, *c*, so that it may swing upward and downward, and is provided with an ordinary locking-dog, *d*, engaging a notched fixed plate, *e*, by which the handle may be held in different positions. By moving the handle up and down the land-wheel may be raised and lowered.

The leading-wheel F is carried at the rear end of a vertically-swinging crank-arm, I, to admit of its being raised or lowered. The crank has its horizontal shaft or journal seated in a bearing on the frame and provided with a crank, *g*, connected by link *h*, or otherwise, to the rod which adjusts the land-wheel, so that the two wheels are adjusted simultaneously. The leading-wheel is carried by a horizontal or substantially horizontal journal on the lower end of a vertical spindle, J, which passes through and is arranged to turn in a crank-arm, so that the wheel may swivel horizontally in turning the implement.

The rear furrow-wheel, G, is also mounted in a lateral journal on the lower end of a vertical spindle, K, turning in a bearing in the frame.

The two spindles J and K are provided, respectively, with crank-arms *l* and *m*, extending in reverse directions and connected by a rod, *n*, whereby the wheels are caused to turn or swivel in opposite directions, in order that the machine may be turned in a small space at the end or corner of the field.

The swiveling action of the wheels is controlled by the right plow-handle, C, which is secured to the spindle of the rear wheel, adapted to swing laterally to turn the same, and provided with an ordinary locking-dog, *o*, to engage the frame and hold it rigidly in place when demanded. By moving the handle C toward its companion, wheel G is turned to the right and wheel F to the left, in which position of the parts the machine will turn to the left toward the land side approximately about the point at which the land-wheel bears on the ground as a center.

From the foregoing description it will be seen that one plow-handle adjusts the two front wheels to regulate the depth of the plow or lift the same out of action, while the other handle controls the horizontal motion of the furrow-wheels, the two handles serving, also, when locked in place, their ordinary function of guiding and controlling the implement when in action.

The essence of the invention resides in controlling the wheels by the handles, and it is manifest that the form and manner of pivoting the handles and other details may be modified, provided the parts retain substantially the mode of action herein described. The combination of the rear wheel, the handle attached thereto, and the locking device therefor is not claimed herein, the same being the subject of an application executed June 16, 1887.

Having thus described my invention, what I claim is—

1. In a wheeled plow, the swiveling front wheel, the swiveling rear wheel, and the intermediate connections, in combination with the plow-guiding handle connected to the rear wheel to turn the same by a lateral movement and a locking device to hold the handle against lateral motion, whereby the handle is enabled to serve its ordinary purpose, and also to change the position of the two wheels for turning the implement.

2. In a wheeled walking-plow, a beam or frame and a mold-board attached thereto, in combination with two vertically-adjustable ground-wheels, a vertically-swinging plow-controlling handle connected to said wheels and provided with a locking device, a horizontally-swinging ground-wheel, and a plow-controlling handle connected with said wheel and provided with a locking device, whereby the attendant is enabled to use the two handles for guiding and controlling the implement as usual, and also enabled to raise and lower the one wheel by one handle and to swivel the other wheel by the second handle.

3. In a three-wheeled plow, the frame having the plow or mold-board attached, in combination with the vertically-swinging and the laterally-swinging handles, each with a locking device, the two vertically-adjustable wheels connected with one handle, and the two horizontally-swinging wheels connected with the other handle.

4. In a wheeled plow, and in combination with the plow-sustaining frame, the land-wheel and its crank-axle, the leading-wheel, its vertical spindle, and the crank-arm carrying said spindle, in combination with the pivoted plow-handle and the rod connecting the same with the wheel-carrying cranks.

5. In a wheeled plow, a frame, a crank-arm pivoted thereto to swing vertically, a vertical spindle free to turn in said arm, a ground-wheel carried by said spindle, a pivoted handle connected to and serving to adjust the crank-arm, and a second pivoted handle connected with and serving to turn the spindle.

In testimony whereof I hereunto set my hand, this 7th day of September, 1887, in the presence of two attesting witnesses.

EDWARD P. LYNCH.

Witnesses:
INGLE BARKER,
GEO. J. BARKER.